United States Patent
Trika et al.

(10) Patent No.: US 7,231,497 B2
(45) Date of Patent: Jun. 12, 2007

(54) MERGING WRITE-BACK AND WRITE-THROUGH CACHE POLICIES

(75) Inventors: Sanjeev N. Trika, Hillsboro, OR (US); John I. Garney, Portland, OR (US); Michael K. Eschmann, Lees Summit, MO (US)

(73) Assignee: Intel Corporation, Santa Clara, CA (US)

( * ) Notice: Subject to any disclaimer, the term of this patent is extended or adjusted under 35 U.S.C. 154(b) by 456 days.

(21) Appl. No.: 10/867,884

(22) Filed: Jun. 15, 2004

(65) Prior Publication Data

US 2005/0278486 A1    Dec. 15, 2005

(51) Int. Cl.
 *G06F 12/00* (2006.01)
(52) U.S. Cl. .................. 711/141; 711/142; 711/143; 711/129; 711/173
(58) Field of Classification Search ................ 711/134, 711/141, 142, 143, 144, 145
See application file for complete search history.

(56) References Cited

U.S. PATENT DOCUMENTS

| | | | |
|---|---|---|---|
| 5,524,234 A * | 6/1996 | Martinez et al. ............ | 711/141 |
| 6,014,728 A * | 1/2000 | Baror ......................... | 711/133 |
| 2005/0125606 A1 | 6/2005 | Garney ....................... | 711/113 |

* cited by examiner

*Primary Examiner*—Jack A. Lane
(74) *Attorney, Agent, or Firm*—Trop, Pruner & Hu, P.C.

(57) ABSTRACT

In one embodiment, the present invention includes a method for writing data to a disk if inserting the data into a cache, such as a disk cache associated with the disk, would cause a threshold of dirty data in the cache to be met or exceeded. Further, in certain embodiments, the cache may store data according to a first cache policy and a second cache policy. A determination of whether to store data according to the first or second policies may be dependent upon an amount of dirty data in the cache, in certain embodiments. In certain embodiments, the cache may include at least one portion reserved for clean data.

12 Claims, 5 Drawing Sheets

MERGING WRITE-BACK AND WRITE-THROUGH CACHE POLICIES

BACKGROUND

Peripheral devices such as disk drives used in processor-based systems are typically slower than other circuitry in those systems. There have been many attempts to increase the performance of disk drives. However, because disk drives are electromechanical, there may be a finite limit beyond which performance cannot be increased. One way to reduce an information bottleneck at the peripheral device, such as a disk drive, is to use a cache. A cache is a memory device that logically resides between a device, such as a disk drive, and the remainder of the system, and that serves as a temporary storage area for the device. Frequently accessed data resides in the cache after an initial access. Subsequent accesses to the same data may be made to the cache instead of to the cached device.

Generally, two types of disk caches are used, write-through cache and write-back cache. A write-through disk cache means that the information is written both to the cache and to the corresponding disk drive. A write-back disk cache means that information is only written to the cache, and the corresponding disk drive is subsequently updated when the corresponding cache line is flushed. A write-back cache allows write accesses to be kept in the cache, as compared to a write-through cache. Write-back cache performance is typically better than for write-through caches. The possible coherency problems with write-back caching (since the data in the cache may be different than in the corresponding disk drive) are solved by flushing the cache lines to the cached device when needed. A cache line of data is dirty if the data in the cache line has been updated by the system but the corresponding disk drive has not been updated. A clean cache line is a line of data in a cache that has been flushed (updated) to the corresponding disk drive.

Write-back systems frequently flush the data in the cache in response to various power events, during crash or power-fail recovery, or opportunistically during lazy-write periods. Such flush operations can take a long time for large disk caches if there is a lot of dirty data in the cache. This can make shutdowns unbearably long and make a write-back disk-caching solution unacceptable for many customers. Further, in recovering from a crash or power failure in a non-volatile write-back cache, dirty portions must be flushed back to the disk drive. This unfortunately requires reading the entire cache metadata/data, which can be excruciatingly slow for a large cache, even if there is only a very small amount of dirty data in the cache. Thus a need exists for more efficient cache operations.

DETAILED DESCRIPTION

Figure 1:
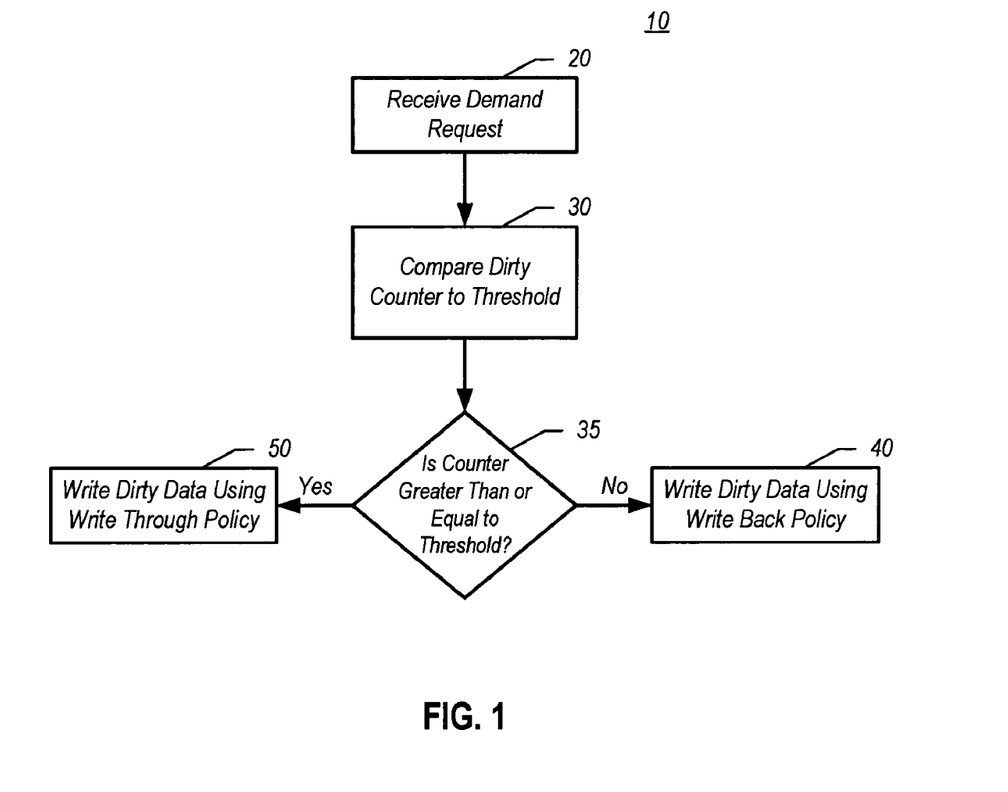
FIG. 1 is a flow diagram of a method of using a cache memory in accordance with one embodiment of the present invention.

Referring to FIG. 1, shown is a flow diagram of a method in accordance with one embodiment of the present invention. More specifically, method 10 of FIG. 1 may be a method for determining whether a given cache event should be performed using a write-back policy or a write-through policy. As shown in FIG. 1, method 10 may begin by receiving a demand request (block 20). For example, such a demand request may be a write demand request issued by a processor. Such a write demand request may be an instruction for certain data to be sent to a storage device, such as a disk drive. Because disk accesses are slow and negatively affect system performance, the write demand request may be effected by instead writing the data to a cache associated with the disk drive (i.e., a disk cache).

Then at block 30, when deciding whether the demand request should result in a dirty insertion (i.e., a write back) or instead should be written through as well to the drive (i.e., a write-through), a dirty counter may be compared to a threshold. Such a dirty counter may track the amount of dirty data (i.e., a dirty count) present in the cache. The threshold may be a user/developer-specified threshold that may indicate a maximum amount of dirty cache space allowed in the cache. For example, in one embodiment, such a dirty threshold may be a maximum amount of dirty cache lines allowed in the cache.

It may thus be determined if the counter value is greater than or equal to the threshold (diamond 35). If the counter value (including the amount of the demand request) is less than the threshold, the dirty data may be written to the cache using a write back policy (block 40). In such manner, the dirty data may be stored in the cache and not be written to the disk drive until a later, more convenient time.

If instead the counter as updated would be greater than or equal to the threshold, control may pass to block 50, where the dirty data may be written using a write-through policy and be written also to the drive. In so doing, a later flush of the cache may be accelerated, as only a certain percentage of the cache may include dirty data to be flushed back to the disk drive.

Figure 2:
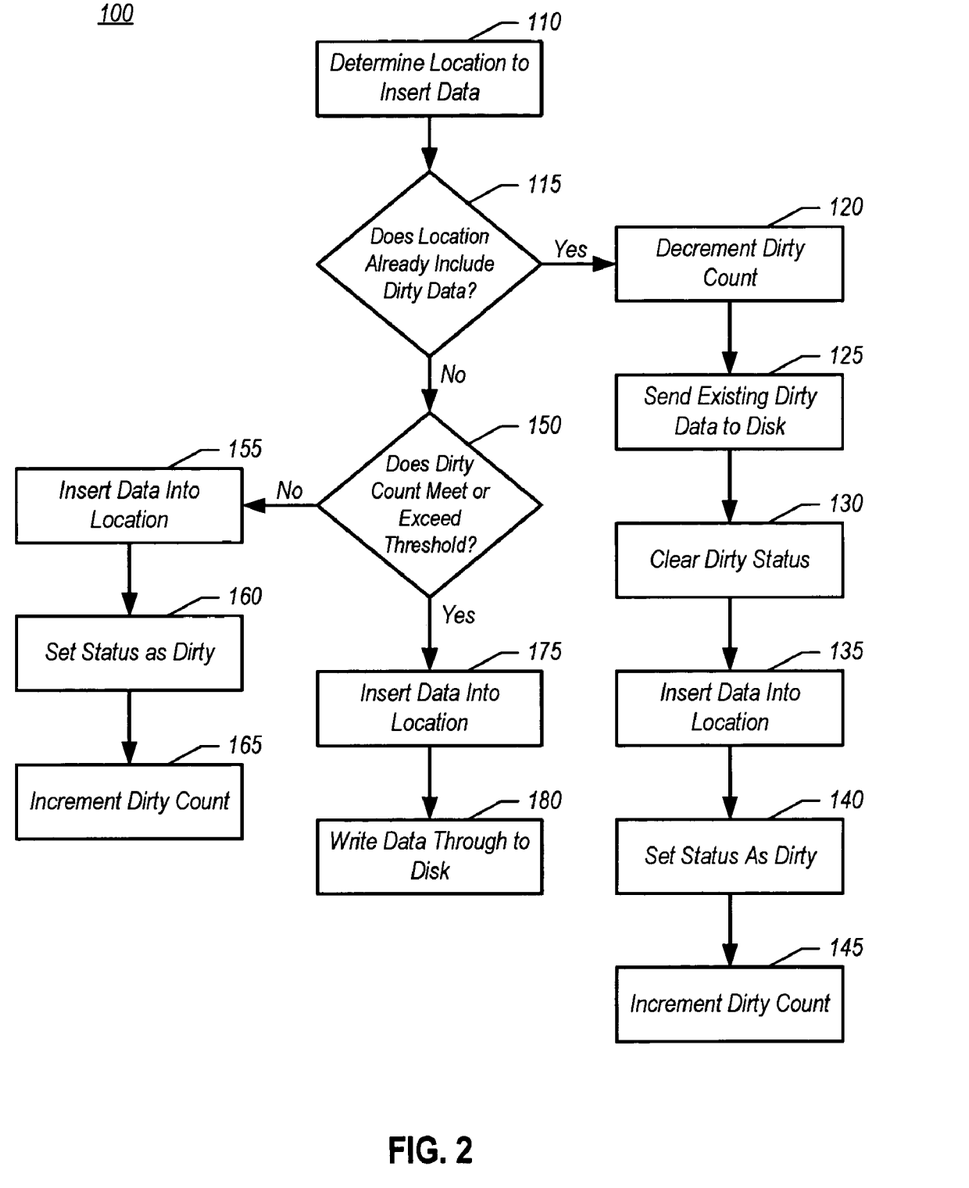
FIG. 2 is a flow diagram of a method of inserting data into a cache in accordance with one embodiment of the present invention.

Referring now to FIG. 2, shown is a flow diagram of a method of inserting data into a cache in accordance with one embodiment of the present invention. As shown in FIG. 2, method 100 begins by determining a location in which to insert data (block 110). For example, management software, such as a cache driver may determine one or more address locations (i.e., one or more cache lines) in which data is to be inserted. Next it may be determined whether the location already includes dirty data (diamond 115).

If it is determined that such location includes dirty data, the dirty data may be flushed to disk. In such an embodiment, a dirty count may be decremented (block 120). Further, the existing dirty data present within the determined location (e.g., a cache line) may be sent to disk (block 125). Then a dirty status for the cache line may be cleared (block 130), and the data desired to be written to the cache may be inserted into the determined location (block 135). Similarly, the status of the cache line to which the data is written may be set as dirty (block 140), and the dirty counter may be incremented accordingly (block 145). For example, if data is written to a single cache line, the dirty counter may be incremented by one. Alternately, in other embodiments, other manners of incrementing a dirty counter may be performed. However, in other embodiments instead of flushing existing dirty data (i.e., at block 125), a programmatic decision may be made to not evict the existing dirty data and instead the new dirty data may be written directly to disk.

If instead at diamond 115 it is determined that the location to which data is to be written does not include dirty data, next it may be determined whether the dirty count (accounting for the data to be inserted) meets or exceeds a threshold (diamond 150). If the threshold has not been met or exceeded, a write-back policy may be adopted and the data may be inserted into the desired location (block 155). Further, the status of the location (or locations) to which the data is written may be set as dirty (block 160). Additionally, the dirty counter may be incremented (block 165).

If instead it is determined (i.e., at diamond 150) that the insertion of data would cause the dirty count to meet or exceed the threshold, a write-through policy may be adopted and the data may be inserted into the location (block 175). Further, the data may be written through to the disk at block 180. In such manner, the data is written directly through to the disk such that the cached data is not dirty, and thus the amount of dirty data within the cache remains at or below the threshold.

Table 1 below shows an example algorithm of implementing a demand write request using a dirty counter and a threshold. In certain embodiments, the algorithm of Table 1 may be implemented in software, firmware, or a combination of hardware and software. For example, in one embodiment, the algorithm may be implemented in cache driver software.

TABLE 1

```
Algorithm ProcessDemandWriteForACachelineDirtyCounter
(DataAddress, Data)
if (DataAddress is a miss) then
    identify cache line C where to insert data
    if (C.valid and C.dirty)
        EvictCacheline (C) // decrement dirty count
        insert Data into C, and set C.dirty // store with write-back policy
        increment DIRTY_COUNT
    else if (not C.dirty)
        InsertDataInCachelineWithWBorWT (C, Data)
    end if
else
    if (C.dirty)
        insert Data into C
    else
        InsertDataInCachelineWithWBorWT (C, Data)
    End if
end if
Algorithm InsertDataInCachelineWithWBorWT (C, Data)
if (DIRTY_COUNT >= DIRTY_THRESHOLD)
    // store with write-through policy
    insert Data into C, and also send it to disk
else
    // store with write-back policy
    insert Data into C, and set C.dirty
    increment DIRTY_COUNT
end if
Algorithm EvictCacheline (C)
If (C.dirty)
    Decrement DIRTY_COUNT
End if
Send C to disk
Clear C.dirty
```

In the above Table 1, three separate algorithms are used to implement write-back and write-through caching policies. Specifically, the algorithm entitled Process Demand Write for a Cacheline Dirty Counter ("Algorithm Process Demand") determines whether a data address of a demand write is present in the cache. If it is not, the algorithm identifies a cache line C in which to insert data and determines whether the cache line already includes data. If the cache line already includes valid dirty data, the cache line may be evicted using Algorithm EvictCacheline (C), which evicts the dirty data to the disk and decrements the dirty counter (DIRTY_COUNT) and updates the status bits of the associated cache lines accordingly. Then control passes back to Algorithm Process Demand for inserting data into the cache line (C) and incrementing the dirty counter.

As shown in Table 1, if the cache line corresponding to the data address is not dirty, control may then pass to Algorithm Insert Data In Cacheline with WB or WT. There, the dirty counter is compared to the threshold (i.e., DIRTY_THRESHOLD) and if the count value is greater than the threshold, the data will be written through to the disk, whereas if the dirty count is less than the dirty threshold, the data is only written back to the cache.

As shown in Table 1 above, if the data address of a demand write is present in the cache, it may then be determined whether the cache line C is dirty. If it is, the data may be inserted into the cache line C. If instead the cache line is not dirty, data may be inserted in accordance with the Algorithm Insert Data In Cacheline with WB or WT for storing of the data with either a write-through or a write-back policy and updating of the dirty counter accordingly.

Thus in the algorithm of Table 1, the counter may track the amount of dirty data in the cache. The counter may be initialized to zero, and when a cache line is inserted dirty into the cache (or a clean cache line is changed to dirty), the counter may be incremented. Similarly, every time a dirty cache line is written back to the disk, the counter may be decremented. The threshold may correspond to a maximum number of dirty cache lines allowed in the cache. In various embodiments, the threshold may be specified as an absolute value (e.g., number of cache lines or size in megabytes) or as a percentage of cache size. In certain embodiments, the threshold may be stored in a driver or other management software as an absolute number of cache lines. Also, in certain embodiments the threshold may be a dynamic or variable threshold based on conditions within a system or such a driver.

As shown in the example algorithm of Table 1, embodiments may merge write-back and write-through caching policies to ensure that the dirty threshold is respected. In certain embodiments, write-through and the write-back caching policies may be combined based on a user control. For example, if the dirty threshold is set at 0%, the cache is fully write-through, and if it is set at 100%, the cache is fully write-back. Intermediate values between the endpoints allow a user or developer to control the extent to which write-back and write-through policies are applied. Run-time performance may be increased by increasing the threshold closer to 100%, and better flush performance may occur by reducing the threshold closer to 0%. Both performance aspects may be desired by users, and thus may be balanced to have a customer-friendly solution, especially in a personal computer (PC) solution, for which power events requiring flushes are common. Further, fast system shutdowns (and other flush events) may be supported, while still achieving desired run-time performance.

In addition to such dirty count analysis, in various embodiments, one or more sections of a cache may be reserved for clean data. In certain embodiments, a cache may be divided into two regions: a clean region, and an arbitrary region. The latter may contain both clean and dirty data, while the clean region may contain only clean data.

While discussed as two regions, it is to be understood that there may be multiple clean regions and multiple arbitrary regions within a cache. The sizes of these two regions may be controlled to obtain the desired performance characteristics during both normal operation and crash recovery. The clean region does not need to be traversed by an option read only memory (OROM) or basic input output system (BIOS) software during crash/power-fail recovery for flush purposes. In certain embodiments, such a cache separation scheme may be implemented without the dirty count analysis discussed above, while in other embodiments the cache segmentation may be implemented with a dirty threshold analysis.

Figure 3:
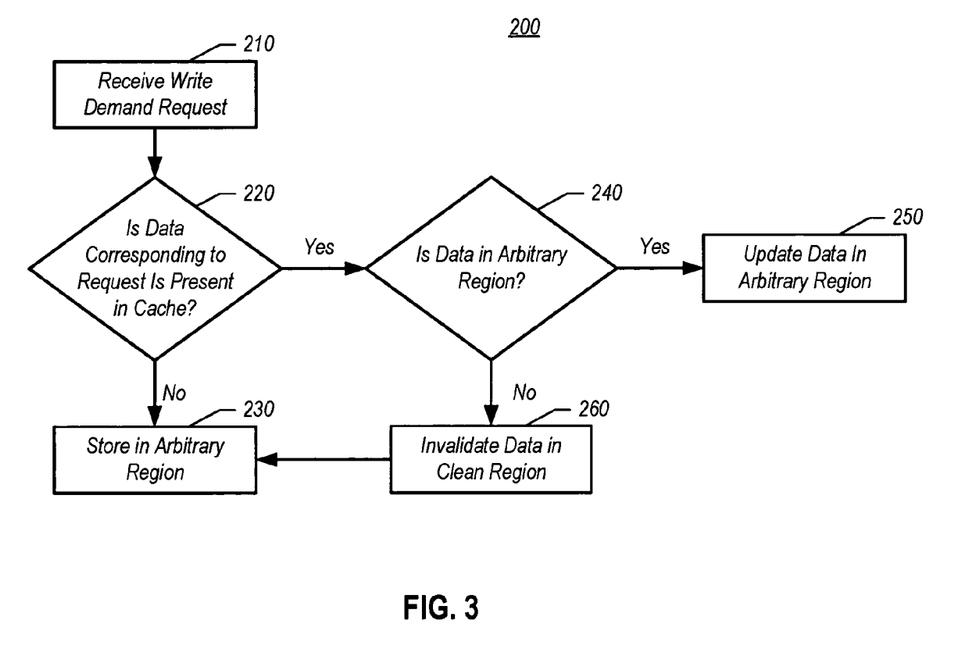
FIG. 3 is a flow diagram of a method of determining where to store data in a cache memory in accordance with one embodiment of the present invention.

Referring now to FIG. 3, shown is a flow diagram of a method of determining where to store data in a segmented cache in accordance with one embodiment of the present invention. As shown in FIG. 3, method 200 may begin by receiving a write demand request (block 210). Such a write demand request may be intercepted or communicated to management software, such as a cache driver associated with a disk cache.

It may then be determined whether data corresponding to the request is already present in the cache (diamond 220). If such data is not already present, the data may be stored in an arbitrary region of the cache (block 230). If instead the data to be written already exists the cache, control may pass to diamond 240, where it may be determined whether the data is present in an arbitrary region. If it is, the data therein may be updated (block 250). If instead, the data corresponding to the request is present in a clean region, the data therein may be invalidated (block 260), and the new dirty data may be stored in the arbitrary region (block 230).

Figure 4:
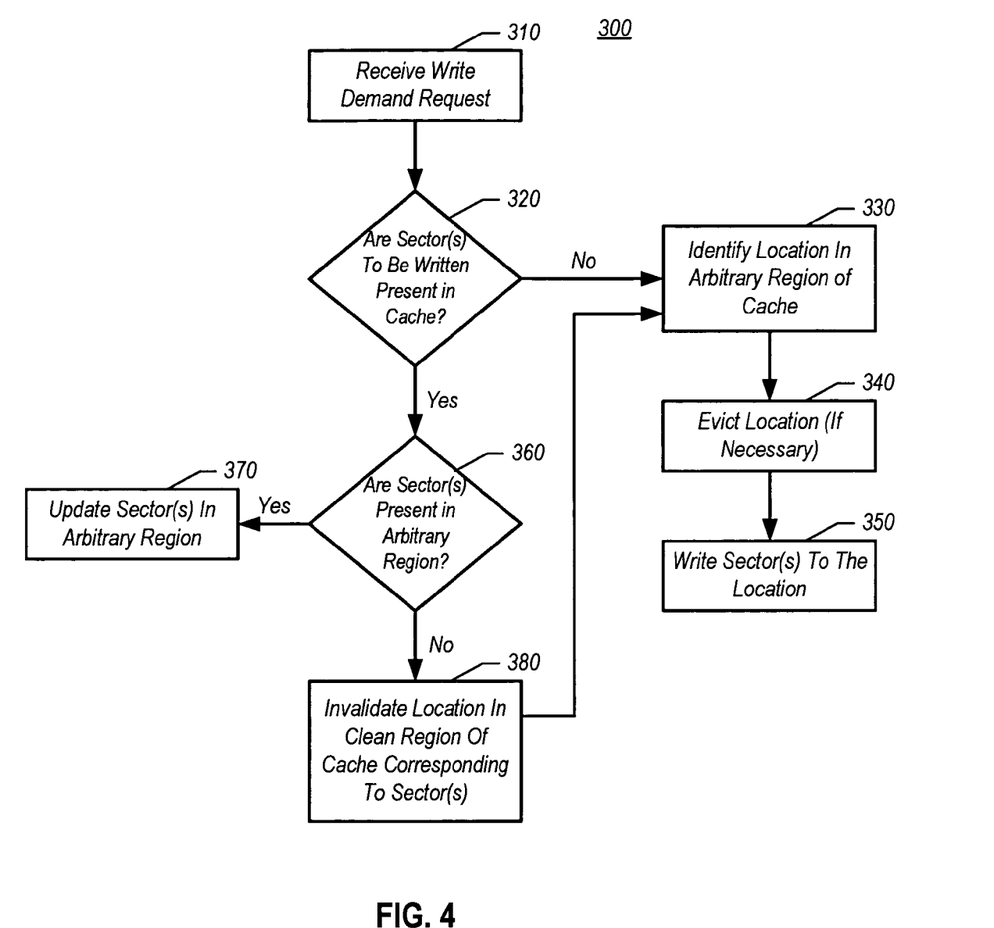
FIG. 4 is flow diagram of a method of writing data to a segmented cache memory in accordance with another embodiment of the present invention.

Referring now to FIG. 4, shown is a flow diagram of a method of writing data to a segmented cache in accordance with another embodiment of the present invention. As shown in FIG. 4, method 300 may begin by receiving a write demand request (block 310). Next it may be determined whether the sector or sectors (e.g., corresponding to one or more disk sectors of an associated disk) to be written to are already present in the cache (diamond 320). If such sectors are not already present in the cache, a location in an arbitrary region of the cache may be identified in which the data is to be stored (block 330). After the location has been identified, data stored in the location may be evicted, if present (block 340). In certain embodiments, such an eviction may be based on a least recently used (LRU) policy. Finally, the sector(s) may be written to the determined location (block 350).

If instead it is determined at diamond 320 that the sector(s) are already present in the cache, it may next be determined whether the sector(s) are present in an arbitrary region of the cache (diamond 360). If the data is present in an arbitrary region, the sectors therein may be updated with the data of the write demand request (block 370).

If instead it is determined at diamond 360 that the data is not present in the arbitrary region, this means that the data is instead present in a clean region of the cache. If the data is present in a clean region, the location(s) within the clean region corresponding to the sectors to be written may be invalidated (block 380). Furthermore, control may pass to block 330 for identification of a location within an arbitrary region and writing the data thereto, as discussed above.

Table 2 below is an example implementation of separating a cache into two distinct regions for a N-way set associative cache, where K ways per set are reserved for clean data, and the other N-K ways may be used for either clean or dirty (i.e., arbitrary) data. Of course, the algorithm of Table 2 may be generalized for other cache sizes, as well as for non-set-associative caches, in other embodiments.

TABLE 2

```
Algorithm ProcessDemandWriteRequest (DataAddress, Data)
S ← ComputeSet (DataAddress)
// first determine whether a request has hit/miss in cache, and cache line
C if hit
hit ← false
For each cache line C2 in S do
    If (C2.tag = DataAddress)
        hit ← true
        C ← C2
    End if
End for
// next determine cache line C where to put data; if hit and in arbitrary
region, do not
// update status of cache line
if (not hit)
    C ← identify cache line in REGION_ARBITRARY of set S to
    place data in
    If (C.valid and C.dirty)
        Evict C to disk
    End if
Else if (C is in REGION_CLEAN)
    C2 ← identify cache line in REGION_ARBITRARY of set S to
    place data in
    If (C2.valid and C2.dirty)
        Evict C2 to disk
    End if
    C.valid ← false
    C ← C2
End else-if
// Place the data in the identified cache line C, which is guaranteed to
// be in REGION_ARBITRARY
C.data ← Data
C.tag ← DataAddress
C.dirty ← true
C.valid ← true
```

The algorithm of Table 2 may be used to process a write demand request issued by a processor to send data to a disk drive having a cache associated therewith. Specifically as shown in Table 2, if the sector(s) to be written are already in the cache and in the arbitrary region (i.e., REGION_ARBITRARY), the data therein is simply updated. If the sectors to be written are not in the cache at all, a cache line in the arbitrary region may be identified, evicted if necessary, and the data written there. If instead the sectors to be written are already in the cache but are in the clean region (i.e., REGION_CLEAN), the data currently in the clean region corresponding to the data may be invalidated, a cache line in the arbitrary region may be identified for the new data (and evicted if necessary), and the new data may be stored in this identified cache line.

In such manner, flush operations (including crash/power-fail recovery) may limit searching for dirty cache lines to the arbitrary region, since the clean region does not include any dirty data. Thus, only a fraction of the data ((N-K)/N in the example of Table 2), may be checked for "cleanliness". While not shown in the algorithm of Table 2, it is to be understood that the segmented cache may include a dirty threshold to control the extent of the arbitrary region. For example, the extent of the arbitrary region may be controlled using a linked list, a directory structure, disjoint partitions, and the like.

Thus in various embodiments, the amount of dirty data in a cache may be limited. Further, dirty data may be restricted to one or more specific cache regions. In such manner, fast flushes for all operations including crash recoveries, demand flushes, lazy writes, and various power events may be accelerated.

Embodiments may be implemented in a program. As such, these embodiments may be stored on a storage medium having stored thereon instructions which can be used to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, a phase change or ferroelectric memory, a silicon-oxide-nitride-oxide-silicon (SONOS) memory, magnetic or optical cards, or any type of media suitable for storing electronic instructions. Similarly, embodiments may be implemented as software modules executed by a programmable control device, such as a computer processor or a custom designed state machine.

Figure 5:
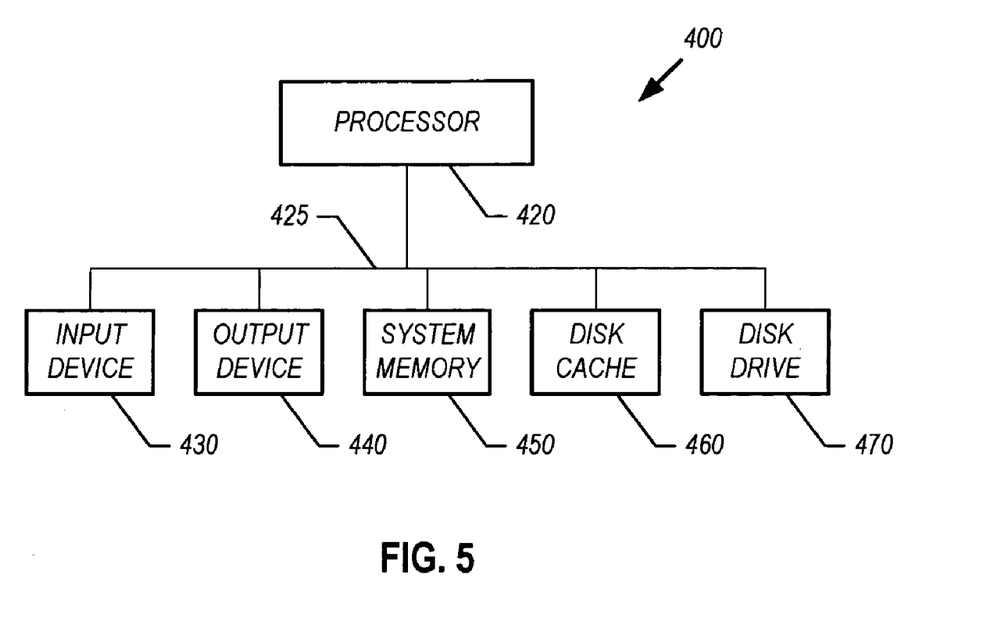
FIG. 5 is a block diagram of a system with which embodiments of the present invention may be used.

Referring now to FIG. 5, shown is a block diagram of a system with which embodiments of the invention may be used. While discussed in FIG. 5 as a computer such as a desktop, notebook, or server computer, it is to be understood that other embodiments may be used with other types of systems, including a wireless device, such as a cellular telephone, personal digital assistant (PDA) or any other variety of other processor-based systems. As shown in FIG. 5, system 400 may include a processor 420 coupled to various devices by a bus 425. In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In various embodiments, one or more such buses in accordance with a desired protocol may be present, and certain components shown in FIG. 5 may be coupled to processor 420 by hub devices such as a memory controller hub and an input/output (I/O) hub. However, such hubs are not shown in FIG. 5 for simplicity.

As shown in FIG. 5, processor 420 may be coupled to an input device 430. Input device 430 may be a keyboard or a mouse, in certain embodiments. System 400 may also include an output device 440 coupled to processor 420. Output device 440 may include a display device such as a cathode ray tube monitor, liquid crystal display, or the like. Additionally, processor 420 may be coupled to a system memory 450 which may include any number of memory devices such as a plurality of read-only memory (ROM) and random access memory (RAM) (e.g., dynamic RAM (DRAM)). Additionally, system 400 may include a disk cache 460 coupled to processor 420. Disk cache 460 may include an option read-only memory which may be a medium for storing instructions and/or data. Other mediums for storing instructions may include system memory 450, disk cache 460, and disk drive 470. In an alternate embodiment, disk cache 460 may be connected to processor 420, and disk drive 470 may instead be connected to disk cache 460. Processor 420 may also be coupled to disk drive 470 which may be a hard drive, a solid state disk device, a floppy drive, a compact disk drive (CD), or a digital video disk (DVD) or the like.

Disk cache 460 may be used as cache storage for disk drive 470, in certain embodiments. Alternately, data from another lower hierarchy memory or storage associated with system 400 may be stored in cache 460. Disk cache 460 may be made from a ferroelectric polymer memory, in certain embodiments. In such an embodiment, data may be stored in layers within the memory, and the higher the number of layers, the higher the capacity of the memory. Each of the polymer layers may include polymer chains with dipole moments. Data may be stored by changing the polarization of the polymer between metal lines. Ferroelectric polymer memories are non-volatile memories with sufficiently fast read and write speeds. For example, microsecond initial reads may be possible with write speeds comparable to those with flash memories. In other embodiments, disk cache 460 may be another non-volatile memory such as a flash memory, although the scope of the present invention is not so limited.

In typical operation of system 400, processor 420 may access system memory 450 to retrieve and then execute a power on self-test (POST) program and/or a basic input output system (BIOS) program. In certain embodiments, BIOS may include code to manipulate disk cache 460. Processor 420 may use the BIOS or POST software to initialize system 400. Processor 420 may then access disk drive 470 to retrieve and execute operating system software and applications. The operating system software may include device drivers which may include, for example, a cache driver for disk cache 460.

It is to be understood that in embodiments in which system 400 is a wireless device, additional components may be present, such as a digital signal processor (DSP) and other such devices. A wireless interface (which in turn may have an antenna which, in various embodiments, may be a dipole antenna, helical antenna, global system for mobile communication (GSM) or another such antenna) may also be present.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    merging a write-back policy and a write-through policy in a cache by determining which of the write-back policy and the write-though policy to use based on an amount of dirty data in the cache, the cache segmented into a first region to store only clean data and a second region to store clean data and dirty data; and
    writing dirty data to the second region of the cache if a threshold amount of dirty data has not been exceeded.

2. The method of claim 1, further comprising writing data to the cache and to a device associated with the cache if the threshold amount of dirty data has been exceeded.

3. An article comprising a machine-accessible storage medium containing instructions that if executed enable a system to:
    merge a write-back policy and a write-through policy in a cache by determining which of the write-back policy and the write-though policy to use based on an amount of dirty data in the cache, the cache segmented into a first region to store only clean data and a second region to store clean data and dirty data; and
    write dirty data to the second region of the cache if a threshold amount of dirty data has not been exceeded.

4. The article of claim 3 further comprising: instructions that if executed enable the system to write back dirty data to the cache if the amount is below a threshold.

5. An apparatus comprising:
a cache to store data according to a first cache policy and a second cache policy, the cache segmented into a first region to store only clean data and an arbitrary region to store clean data and dirty data, the cache comprising a N-way set associative cache, wherein K ways per set are segmented for clean data and N-K ways per set are segmented for arbitrary data including clean data or dirty data.

6. The apparatus of claim 5 further comprising a storage medium including instructions that if executed determine which of the first cache policy and the second cache policy to use based on an amount of dirty data in the cache.

7. The apparatus of claim 5, wherein the cache comprises a non-volatile disk cache for a disk drive.

8. The method of claim 1, wherein the cache comprises a disk cache to act as a cache storage for a disk drive.

9. The method of claim 8, wherein the disk cache comprises a nonvolatile memory.

10. The method of claim 1, further comprising traversing the second portion of the cache and not traversing the first portion of the cache during a crash recovery.

11. The article of claim 3, further comprising instructions that if executed enable the system to traverse the second portion of the cache and not traverse the first portion of the cache during a crash recovery.

12. The apparatus of claim 7, wherein the non-volatile disk cache comprises a ferroelectric polymer memory.

* * * * *